United States Patent [19]
Skelly

[11] Patent Number: 5,734,167
[45] Date of Patent: Mar. 31, 1998

[54] METHODS FOR FARMING

[75] Inventor: James A. Skelly, Rocky River, Ohio

[73] Assignee: Day-Glo Color Corporation, Cleveland, Ohio

[21] Appl. No.: 627,463

[22] Filed: Apr. 4, 1996

[51] Int. Cl.⁶ ..................................................... A01B 69/00
[52] U.S. Cl. ............................... 250/458.1; 250/459.1; 250/461.1
[58] Field of Search ................... 250/462.1, 461.1, 250/302, 459.1, 458.1; 206/81, 459.5

[56] References Cited

U.S. PATENT DOCUMENTS

| | | | |
|---|---|---|---|
| 132,874 | 11/1872 | Stevens | 206/568 |
| 2,520,680 | 8/1950 | Hamilton | 111/26 |
| 2,644,890 | 7/1953 | Hollihan . | |
| 2,775,710 | 12/1956 | Ludeman . | |
| 3,105,954 | 10/1963 | Gill, Jr. . | |
| 3,839,638 | 10/1974 | Hughes . | |
| 3,934,149 | 1/1976 | Nehrich, Jr. et al. | 250/459.1 |
| 4,000,975 | 1/1977 | Christenbury et al. . | |
| 4,421,772 | 12/1983 | Munck et al. . | |
| 4,481,422 | 11/1984 | deMarco et al. | 250/459.1 |
| 4,650,336 | 3/1987 | Moll . | |
| 4,657,087 | 4/1987 | Livneh . | |
| 4,677,008 | 6/1987 | Webb . | |
| 4,745,276 | 5/1988 | Broicher et al. . | |
| 4,804,850 | 2/1989 | Norrish et al. . | |
| 4,876,206 | 10/1989 | Sayer . | |
| 4,955,437 | 9/1990 | Bohman . | |
| 4,991,341 | 2/1991 | Douglas . | |
| 5,033,031 | 7/1991 | Bohman . | |
| 5,044,756 | 9/1991 | Gaultney et al. . | |
| 5,130,545 | 7/1992 | Lussier . | |
| 5,234,070 | 8/1993 | Noah et al. . | |
| 5,281,826 | 1/1994 | Ivancic et al. | 250/461.1 |
| 5,294,798 | 3/1994 | Hartman | 250/458.1 |
| 5,296,702 | 3/1994 | Beck et al. . | |
| 5,324,940 | 6/1994 | Ekstrom | 250/302 |
| 5,509,486 | 4/1996 | Anderson | 172/6 |

OTHER PUBLICATIONS

Advertisement of Becker–Underwood, Inc. for "Foam Dye — Takes the Guesswork Out of Applying Fertilizers and Pesticides" (one page).

Primary Examiner—Constantine Hannaher
Attorney, Agent, or Firm—Calfee, Halter & Griswold LLP

[57] ABSTRACT

Methods of farming, which are particularly useful at nighttime, include a method of using apparatus to enable an equipment operator to determine and maintain a course along a field. The methods enable a user to determine spray patterns in target areas that have been sprayed with agricultural products. The methods employ fluorescent pigments and a source of illumination which causes the fluorescent pigments to fluoresce.

24 Claims, 4 Drawing Sheets

METHODS FOR FARMING

BACKGROUND OF THE INVENTION

As the world's need for food increases, the need for efficient food production also increases. Seasonal variation and nightfall limits the time available for planting, fertilizing, harvesting and other farming procedures.

Night farm operations, particularly operations that require transversing a field, are difficult because it is difficult for farm equipment operators to see where they are going and where they have been. Lighting the entire field at night particularly large fields, is expensive and impractical.

Nighttime spraying of crops is difficult because it is difficult to see where spray is applied; yet, daylight spraying of crops, particularly orchards, is often undesirable because valuable insects, such as bees, are present and frequently the bees are killed. The wind during the day also carries the spray beyond the target area.

It would be desirable to have a method of farming at nighttime that: permits the equipment operators to determine where they have been, and where they are going. It would also be desirable to have a method that permits a farmer to determine areas recently sprayed with herbicides, pesticides and fertilizer. It would be desirable to have methods and apparati for applying pesticides at night, and for farming at night particularly planting at night.

SUMMARY OF THE INVENTION

The present invention provides novel methods of farming, which are particularly useful at nighttime, and relate to methods for applying agricultural products and to traversing a field, to enable an equipment operator to determine and maintain a course along a field. The methods of the present invention enable a user to determine spray patterns in target areas that have been sprayed with agricultural products.

The methods of the present invention employ fluorescent dyes and pigments, preferably fluorescent pigments, and illumination sources which emit light of wavelength that cause the fluorescent pigments and dyes to fluoresce, so that the pigments and dyes are visible at night, as well as during the day. Preferably, the methods employ a water based pigment system which contains a pigment possessing excellent water resistance and which does not contain volatile organic solvents. The method of traversing a field embodiment comprising the following steps: providing a vehicle equipped with an illumination source and a marker dispenser which dispenses fluorescent markers; providing a light source which emits light having wavelengths that will cause the markers to fluoresce; depositing the fluorescent markers along the field using the marker dispenser; directing the light from the light source on to the fluorescent markers to cause the fluorescent markers to fluoresce; detecting the fluorescence; aligning the vehicle with the fluorescent markers; traversing the field using the fluorescent markers as a guide.

The method of applying a product to vegetation or soil embodiment comprising the following steps: providing a product containing a fluorescent pigment or dye; providing a light source which emits wavelengths that will cause pigment or dye to fluoresce; applying the product onto the vegetation or soil; directing a light onto the vegetation or soil which will cause pigment or dye to fluoresce; detecting the fluorescence of the fluorescent pigment or dye. The invention also relates to a kit for determining the amount of an agricultural product applied to vegetation.

The invention also relates to a pathway detection system for use in the method of traversing the field and comprises: an illumination source adapted for attachment to the farm equipment which emits wavelengths of light which will cause the marker balls to fluoresce; a sensor adapted for attachment to the farm equipment for detecting fluorescence of the marker balls; and a display device which is connected to the sensor for displaying the position of the marker balls relative to the equipment.

DETAILED DESCRIPTION OF THE INVENTION

The present invention provides novel methods of farming, which are particularly useful at nighttime, and include a method and apparatus to enable an equipment operator to determine and maintain a course along a field. Another method of the present invention enables a user to perceive spray patterns in target areas that have been sprayed with agricultural products including for example, herbicides, pesticides, and fertilizer.

The methods of the present invention employ fluorescent pigments and dyes, preferably a fluorescent orange pigment, and illumination sources which emit light of wavelength that cause the fluorescent pigments and dyes to fluoresce. Preferably, the methods employ a water based pigment system which contains a pigment possessing excellent water resistance and preferably which does not contain volatile organic solvents. As used herein agricultural product are products employed in farming and horticulture including but not limited to herbicides, pesticides, fertilizers, fungicides, bacterial cultures and other products used in the planting, cultivation, landscaping and soil treatment.

Method of Spraying

In one method of farming, the fluorescent pigments or dyes are added to agricultural products to provide a fluorescent product. The fluorescent product is applied by typically spraying onto a target area, such as for example an orchard or field, using conventional spray equipment, for example, aerial spray equipment. Illumination sources are then directed at the sprayed target area; when the fluorescent pigments or dyes in the product are illuminated, they fluoresce. Preferably the illumination sources are hand held lamps or lamps mounted in or on a vehicle such as a tractor or airplane. The user is then able to perceive the spray pattern or the target area to determine the evenness and completeness of the application. The portions of the target area which did not receive the product become readily apparent. Similarly areas outside the target area which received the product become apparent. Thus, after spraying, particularly after a preliminary or test spray, it is possible to determine whether the spray has drifted out of the target area. The direction of spray is adjusted accordingly, thereby reducing the drift of the agricultural compositions beyond the desired target onto, for example, other crops, or into waterways. Thus, the presence of fluorescent pigment or dye in an agricultural chemical permits spray application under conditions of poor visibility, such as for example, night or in fog. Being able to spray at night is particularly desirable since the wind typically diminishes at night.

Figure 6:
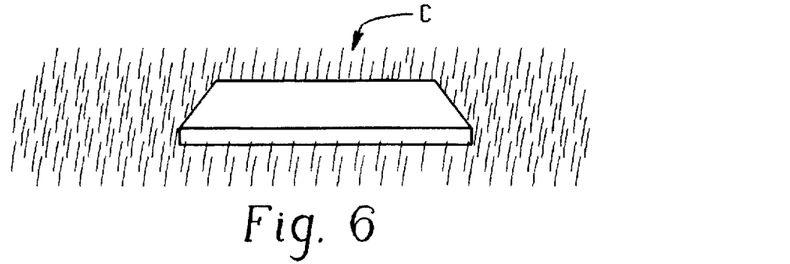
FIG. 6 shows a collector for fluorescent product positioned in a target area such as a field.
Figure 7:
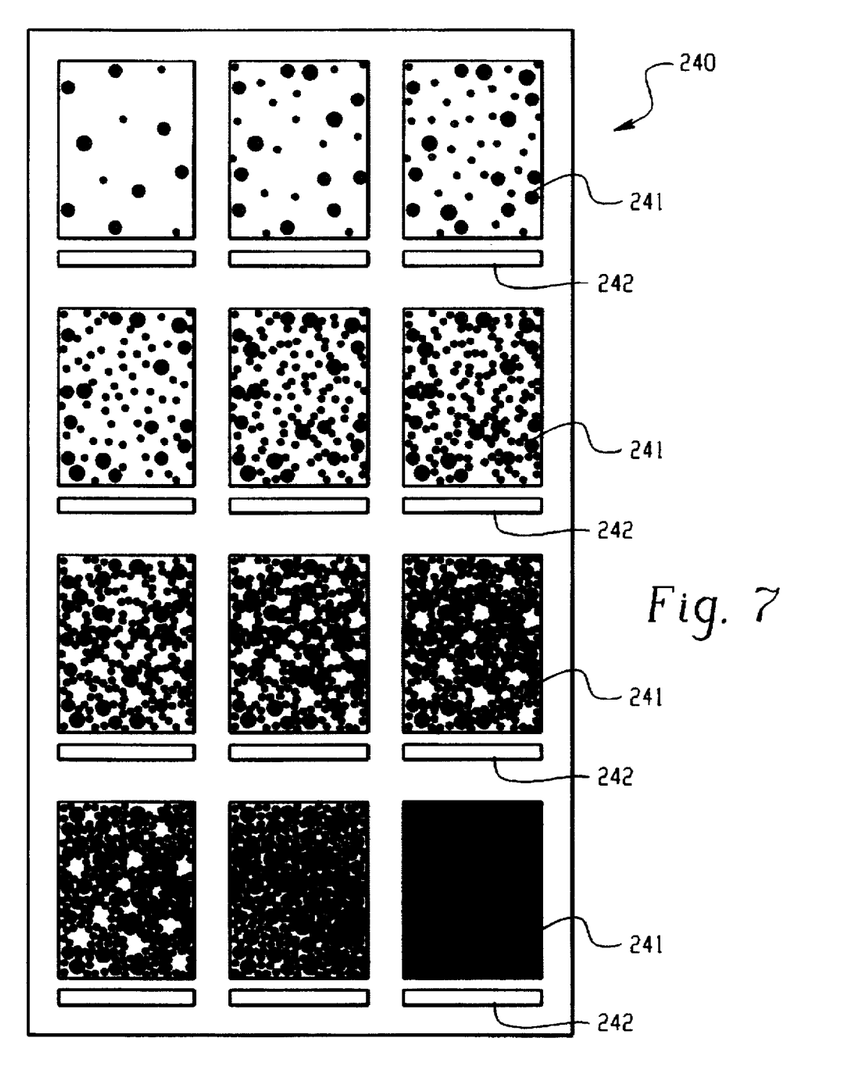
FIG. 7 shows the fluorescent color standard of FIG. 5.

A further advantage of adding fluorescent pigment dye to the product is the amount of product that has been applied to the target is readily quantifiable. Before application of the fluorescent product, a collector such as piece of paper is positioned in the target area as shown in FIG. 6. After spraying, the collector is removed and the fluorescence is quantified using spectrophotometry. Alternatively the collector may be visually compared to a standard to which a given amount of fluorescent product has been applied. In such a manner a farmer can determine whether the a crop duster has applied the proper amount of agricultural product to the field.

The fluorescent product in the agricultural chemical also enables the accurate identification of areas that have been sprayed; this is particularly desirable where governmental regulations require the particular target area to be marked to indicate the presence of certain chemicals. The preferred pigments also fluoresce in daylight which enables the sprayed area to be determined in both night and day.

It is understood that in addition to determining drift with spray applications, such methods of spraying are also useful with other application methods including for example powder products. Also, this method is useful in the daylight particularly where the chemical is not readily visible on the target. The presence of the fluorescent pigment or dye is useful for both blanket spray as well as spot application such as individual weeds in a yard.

Method and Kit for Determining Correct Application of Chemical

Many conventional agricultural products, particularly liquid preparations, are incorrectly applied to the target because of the users inability to gauge the amount of the chemical being applied.

The present invention provides a method and a kit to verify that proper amount of the agricultural product is applied. The kit comprises a fluorescent product and a fluorescent color chart. The fluorescent product contains a fluorescent pigment or dye and the agricultural chemical. The user applies the fluorescent product according to the manufacturer's instructions. The user compares the color of the target area to which the fluorescent product has been applied, to the fluorescent color chart to verify that the correct amount of the product has been applied. The fluorescent chart contains at least one picture, preferably three pictures of a target plant coated with fluorescent product. Preferably the chart contains images such as photographs, drawings pictures, or other representations, which are printed with the same fluorescent pigment or dye as is present in the fluorescent product. As shown in FIG. 3, in the preferred embodiment, first image 112 depicts vegetation with insufficient product, second image 114 depicts what vegetation with too much product and third image 116 depicts vegetation with the correct amount of product. In a less preferred embodiment, the chart contains a single image depicting vegetation that has received the correct amount of fluorescent product. Alternatively the chart contains a picture which shows the appearance of vegetation that has received insufficient fluorescent product, and picture which shows the appearance of vegetation that has received too much fluorescent product.

For example, the preferred embodiment, as shown in FIG. 4, the kit 100 preferably comprises container 120 which contains fluorescent product 130 and chart 140 which is preferably affixed to container 120. Chart referring to FIG. 3, 140 comprises: picture 112, with indication 113 indicating insufficient product, which shows the appearance of vegetation that has received insufficient fluorescent product; picture 116, with indication 117 indicating the correct amount of product which shows the appearance of vegetation that has received the correct amount of fluorescent product, and picture 114, with indication 115, indicating too much product, which shows the appearance of vegetation that has received excessive fluorescent product. The user compares the pictures on the chart to the vegetation that has just been sprayed to ensure adequate amount is applied yet prevent excess application characteristic of many users. Not only is waste prevented but less product ends up in the environment.

Many conventional agricultural products are typically packaged in a concentrated form. The end user, whether farmer or homeowner dilutes the concentrated chemical, according to package instructions. Errors in user judgment can occur at the dilution which leads to waste and excess product in the environment. By including fluorescent pigment or dye in the agricultural product and providing a fluorescent color standard the user can dilute the agricultural product to match the standard to assure that the appropriate dilution has been obtained. Referring to FIG. 5, kit 200 is shown with fluorescent agricultural product 130, container 120 for containing fluorescent product 130, and color standard 240. Color standard 240 is shown in detail in FIG. 7; blocks 241 show various color concentrations for comparison to the fluorescent product and blocks 242 recite color concentration which corresponds to the block 241.

Method for Traversing a Field at Night

Traversing a field on farm equipment is difficult even in daylight because the operator cannot always determine from the appearance of the ground whether he has treated/passed over the ground on his previous pass across the field. Currently, farm equipment is often equipped with a conventional mechanism which deposits markers onto a field. Such conventional markers are composed of a foam such as butyl acetate which typically degrade in a few days. The markers are typically colored. The markers are used during daylight to guide a farm equipment operator back and forth across the field. As the equipment operator traverses the field, in one direction during the day, markers are periodically dropped onto the field. As the operator makes the return trip across the field in the opposite direction, he aligns his equipment with the markers that were dropped during his previous trek across the field and proceeds across the field following the markers. As the tractor proceeds, markers are dropped typically off the other side of the equipment forming a new line of markers which he will then follow on his next trip across the field. Accordingly, the farmer ensures that he passes over the entire field and does not fail to plow, plant, harvest, treat any portion of the field.

In the method of the present invention, one or more illumination sources which emit light in a wavelength range that will cause markers to fluoresce are positioned on the farm equipment. The illumination sources are movably positioned (e.g. on a swivel mount) external to the equipment to direct light on the markers as they lay on the ground. One such lamp is manufactured by Philips Automotive Lighting and sold under the trade name "Micro Power-Light", although any illumination source which will emit light in a wavelength range that will cause the markers to fluoresce will suffice. Preferably the illumination source emits light comprising wavelengths in the range of 250 to 800 nm, more preferably 300 to 500 nm.

The fluorescence of the markers is detected either by the tractor operator, or preferably, by a sensor for detecting the fluorescence so the markers. Preferably, a display device is electrically connected to the sensor, so that upon receiving a signal from the sensor, the display device indicates the tractor position relative to the markers. In the preferred embodiment, the display device is mounted in the cab for convenient reading by the tractor operator. Thus, the sensor device detects the fluorescent markers and indicates to the operator whether he is left or right of the markers so that the operator may adjust the path of the tractor accordingly.

Preferably, the illumination source is mounted onto the farm equipment, more preferably to a tractor boom, and positioned so as to illuminate those markers laid on the operator's previous trip across the field. In embodiments in which no sensor device is employed, it is preferred that the illumination source be positioned so as to direct the light in the direction of the tractor's travel, so that the operator can see the markers.

Figure 1:
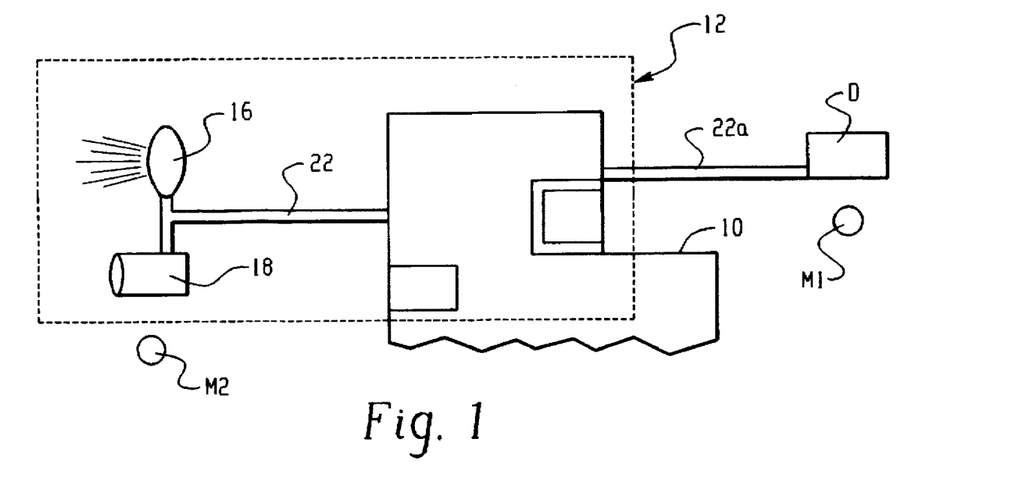
FIG. 1 is a diagram of the apparatus for traversing a field at night.

Devices for forming depositing markers are commercially available. A suitable foam marker depositing device is available as an accessory to boom sprayers from Hardi Inc., Davenport Iowa, and John Deere. Such devices form the markers from materials fed into the machine. For example, as shown in FIG. 1, markers M1 are deposited on the ground by dispenser D. Dispenser D is mounted to farm equipment by conventional devices such as tractor boom 22a shown in FIG. 1. The markers are formed by following the manufacturer's instructions.

Suitable markers are formed from, for example, butyl cellusolve and isopropanol, which is available under the trade name "Super Foamer X-tra", from Holloway Farm Supply, Inc. The markers are preferably colored with fluorescent pigment by adding fluorescent pigment along with the butyl cellusolve. While markers colored with a fluorescent dye are suitable they are less preferred. Using a fluorescent pigment rather than a fluorescent dye has several advantages. First, the fluorescent pigment in which the fluorescent dye is associated with a carrier, will not dye plants as fluorescent dye alone will. Second, balls dyed with fluorescent dye lose the ability to fluoresce as the marker dries out. Indeed in large fields, the markers can dry out before the farmer makes the return pass on the field. Where the markers are colored with the fluorescent pigment the dried markers will fluoresce even as they dry out. The fluorescent pigments particularly the preferred embodiment wash away with rain. The preferred pigments do not contain free rhodamine dye, and the most preferred do not contain rhodamine dye.

FIG. 1 shows a tractor 10 on which is installed a vehicle pathway detection system 12 constructed according to the principles of the present invention. The pathway detection system 12 is used to detect the position of fluorescent markers M2 which have been released from the tractor to indicate the path that the tractor has previously traversed. Positional information representing the detected position of the fluorescent markers is provided to operator. Based on this positional information provided by vehicle pathway detection system 12, the operator may accurately guide the tractor along a pathway immediately adjacent to that just traversed, thereby insuring that the entire field is evenly and completely treated, harvested, planted etc.

Figure 2:
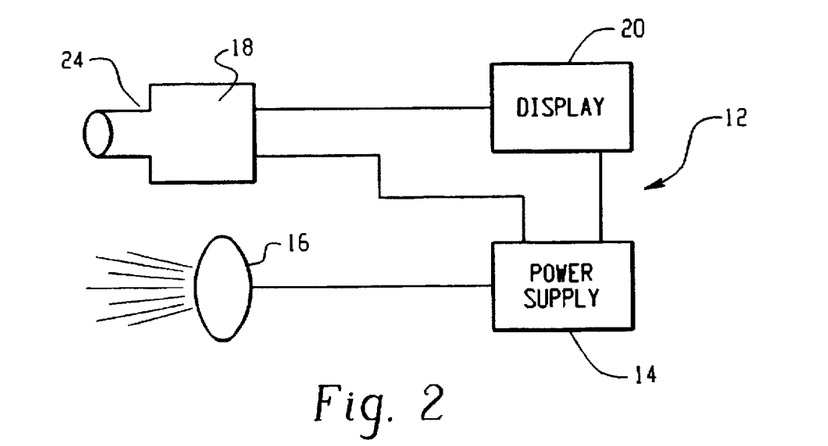
FIG. 2 shows the preferred display of the displayed device used to traverse a field at night.
Figure 3:
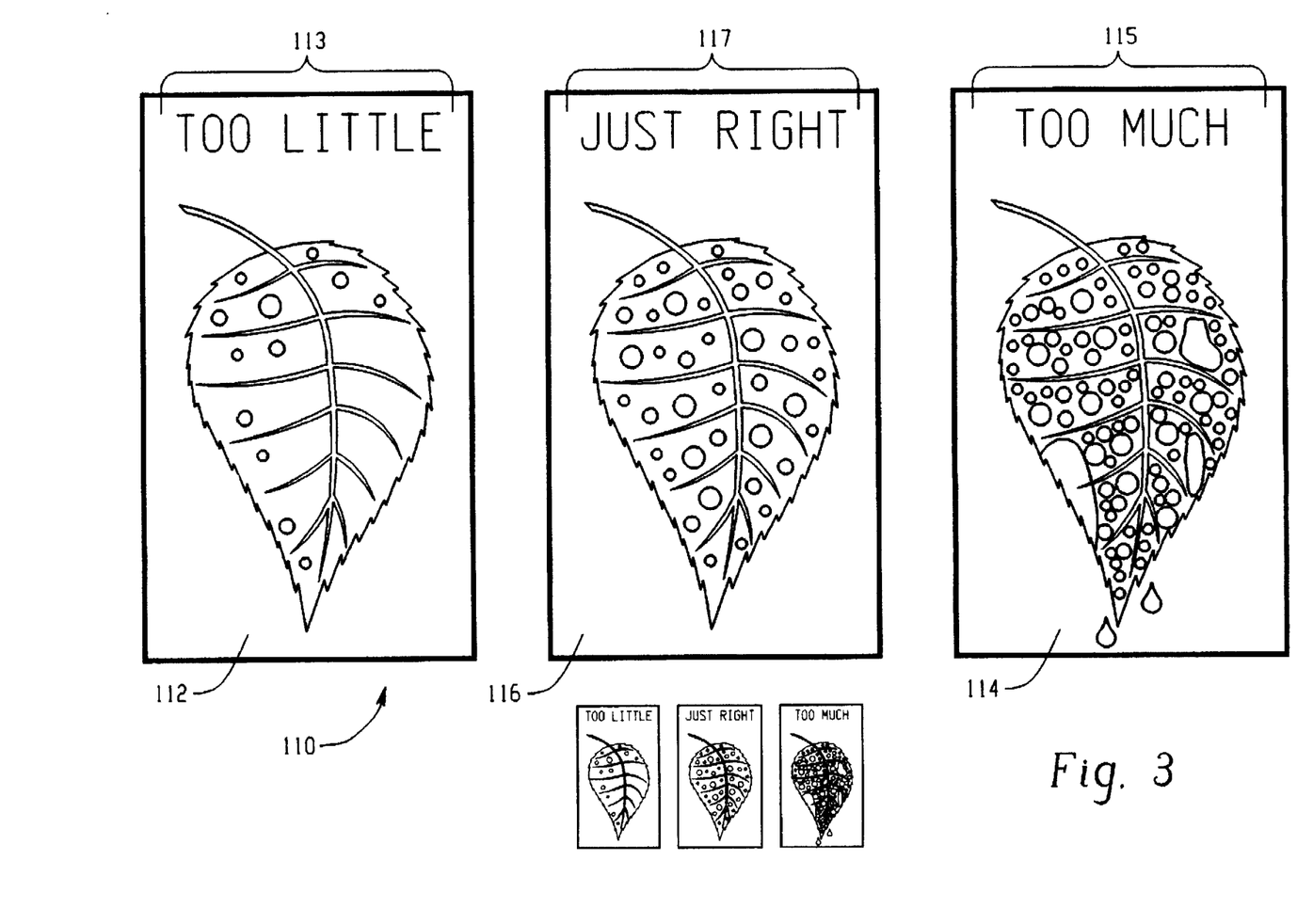
FIG. 3 shows a chart for indicating the proper amount of agricultural product to be applied to target vegetation.
Figure 4:
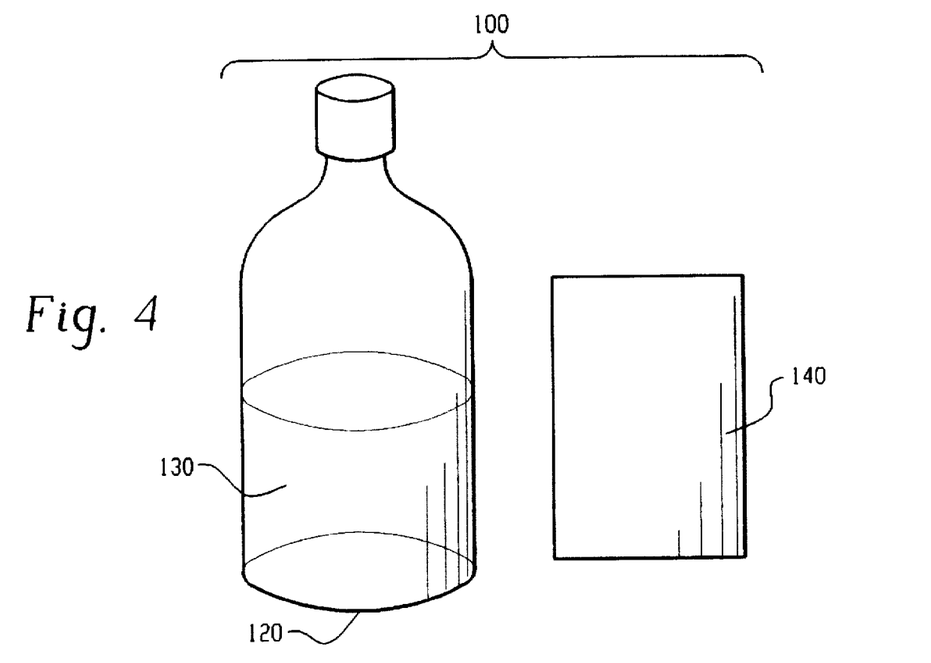
FIG. 4 shows a kit for determining the amount of an agricultural product applied to vegetation, having a container, a fluorescent agricultural product, in the container, and a fluorescent color chart as shown in FIG. 3.
Figure 5:
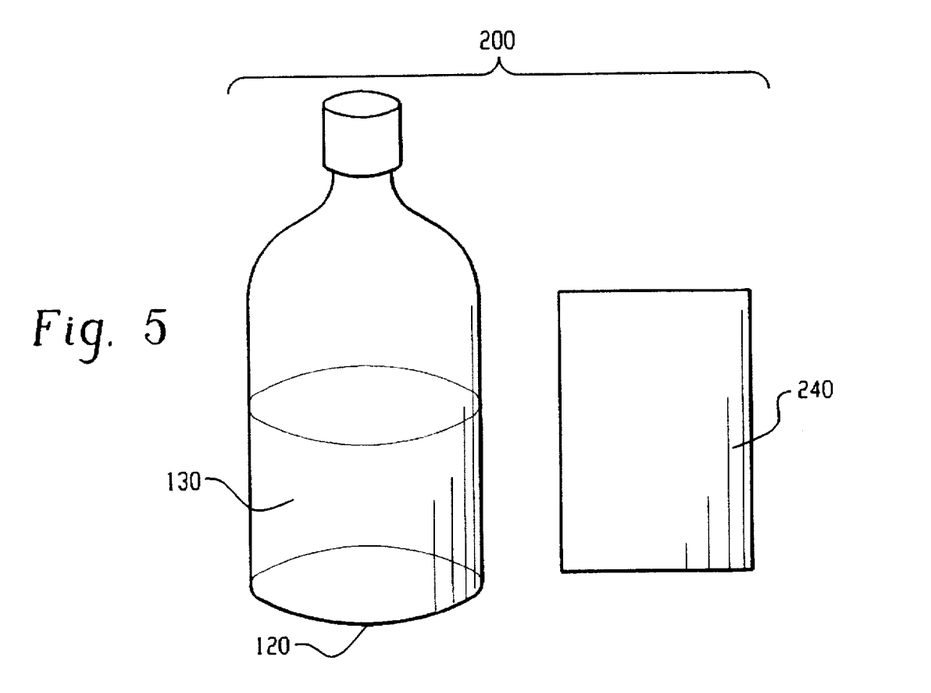
FIG. 5 shows a kit for determining the amount of an agricultural product applied to vegetation, having a container, a fluorescent agricultural product in the container, and a fluorescent color standard.

FIG. 2 is a schematic block diagram of the vehicle pathway detection system 12. As shown in FIG. 2, the system 12 comprises a power supply 14, an illumination source 16, a detector 18, and a display 20. The power supply 14 is preferably a DC power supply which is designated solely for providing power to the detector 18, the illumination source 16 and the display 20. Alternatively, the standard 12 volt DC battery typically found on the tractor 10 may be used as the power supply 14. The power supply 14 is hardwired to each of the detector 18, the illumination source 16, and the display 20, as shown in FIG. 2.

Referring back to FIG. 1, the illumination source 16 is preferably mounted to a boom 22 extending from the rear of the tractor. However, it is contemplated that the illumination source 16 may be mounted at any position on the tractor which enables the illumination source to provide illumination for the fluorescent markers positioned below on the field. Because the markers are fluorescent, the illumination source in the preferred embodiment is a "black light" illuminator which provides a source of ultraviolet (UV) light for illuminating the fluorescent markers.

The enclosure for the illumination source 16 is preferably made to resist vibration, dust and moisture to prolong the life of the illumination source under the anticipated field operating conditions. An ultraviolet transmissive lens may be provided for the illumination source. In one preferred embodiment, the illumination source operates at 12 volts DC and outputs approximately 400 µW/cm$^2$ (microwatts per square centimeter) at a distance of 5 meters from the illumination source. In addition, a remote ON/OFF switch for the illumination source is provided for the convenience of the operator.

The illumination source 16 provides a source of UV light to illuminate the markers. Non-fluorescent markers are commercially available under the trade name Foam Concentrate/ 60 to 1 from Becker-Underwood. These commercially available markers may be made fluorescent by coloring them with a fluorescent pigment. When illuminated by the UV illumination source 16, the markers respond by fluorescing, or glowing.

The detector 18 senses the position of the UV illuminated fluorescent markers and provides positional information indicative of the sensed marker position to the display 20. Like the illumination source 16, the input to the detector 18 is the 12 volts DC provided by the power supply 14. The output of the detector 18 is used as the input to the display 20.

In one preferred embodiment of the invention, the detector 18 is a Micro-optic II series 8230 detector available from Dolan Jenner industries of Lawrence, Mass. In another preferred embodiment, the detector 18 is a Honeywell Model HVS 256, available from Honeywell Visitronic, Englewood, Calif. Still another preferred detector is a SICK LUTI-4 luminescence scanner provided by Rilco Inc., Cincinnati, Ohio. Such detectors are capable of providing a resolution of 1/4000th of the field of view, and a detection range of between 2 inches and 20 feet. The field or range of detection may be made adjustable with such detectors.

The detector is configured to determine user-definable edge locations of an object, the width, that is, the difference between two edges, of an object, or the center position of an object based on its width. For example, the detector 18 may be calibrated to recognize the first left edge or the first right edge of an object such as a fluorescent marker. The detector may provide edge measurement accuracies of 1/1000th of the field of view. In this manner, the detector 18 is able to provide high-speed and highly accurate information relating to the detected position of the marker, without contacting the marker.

The object to be detected, such as a marker, is viewed by the detector through an optical lens, which is interchangeable with other similar-type lenses. The detector remains insensitive to minor ambient lighting changes. In addition, the detector 18 may be made even more insensitive to minor ambient lighting conditions by the addition of a filter 24 for the lens. The optional filter 24 transmits detected illumination or fluorescence only within a particular range of wavelengths in which the fluorescent marker is most active. Such a filter 24 is especially effective when used in an environment of cornstalks or leaves, both of which tend to fluoresce when illuminated by the illumination source 16.

Brightness variations in contrast (grey scale levels) between the marker and the background are detected and converted to electrical signals by the detector electronics. A non-volatile memory, which stores these signals, is provided for the detector to guard against loss of positional information during any unanticipated interruption of the power supply 14. The output of the detector 18 is then provided to the display 20 for the operator to view.

The output of the detector 18 is provided in either analog or digital form. In analog form, the output signal may be a 0 to +5 volt, 0 to +1.5 volt, −5 to +5 volt, or 0 to +10 volt voltage signal, or a 4–20 milliamp current signal. In digital form, the output signal may be either in RS 232-C or RS 422/485 serial format. The digital output may be connected directly to a 232 or 422/485 serial communications port on the display 20. For shorter distances, RS 232-C works well and interfaces directly with microcomputers or personal computers (PCs).

The display 20 receives the positional information in the form of electrical signals (analog or digital) from the detector 18. The display converts these electrical signals to a visual display which the operator may view. Based on the information which is presented on the display, the operator may guide the tractor along a prescribed pathway, which is typically immediately adjacent to that just traversed.

Illumination Sources Employed in the Methods and Pathway Detection System of the Present Invention The illumination source is selected depending upon the absorbance of the fluorescent pigment or dye to be used in the method. Illumination sources which emit light comprising wavelengths of from about 300 to about 500 nm are preferred for use with Blaze Orange™ fluorescent pigment. The Blaze Orange™ fluorescent pigment will emit light at a wavelength of about 585 to about 595 nm. The Blaze Orange™ fluorescent pigment absorbs light having a having a wavelength below 585 nm, but primarily absorbs light having wavelength at 485 to 495 nm. This is characteristic of fluorescent pigments; they absorb light having a wavelength below the wavelength at which they emit and absorb the most light about 100 nm below their emission wavelength. Illumination sources that emit wavelengths in addition to the 300–500 nm wavelengths are suitable, though less referred. Illumination sources which do not emit any wavelengths in the ultra-violet are suitable although much less preferred. Illumination sources preferably emit a beam of light that extends at least 5 feet, preferably at least 8 feet.

Suitable illumination sources include for example, halogen, gas discharge and xenon. Halogen lamps such as available from General Electric Lighting, Nela Park Ohio under the designation H7600 are suitable. Gas discharge lights are available from Phillips Lighting under the designation "Micro Power Light". It is preferred that such halogen lamps are fitted with a filter that restricts transmission of light to those wavelengths that can be absorbed by the fluorescent pigment. Preferably, the filter absorbs visible light and transmits ultra violet light at a range of about 300 to about 430 nm, when the preferred fluorescent Blaze Orange™ fluorescent pigment is employed. A preferred filter is a 5 inch diameter rounded filter, having a thickness of 0.215 plus or minus 0.015 inches, which transmits greater than 0.47 percent of light 365 nm wavelengths and transmits less than 0.012 percent of light at 405 nm or higher. Such preferred filter is available under the designation Composition number 1041, from Kopp Glass Inc., Pittsburgh, Penn.

Fluorescent Indicators

The fluorescent indicators include fluorescent pigments and fluorescent dyes. The fluorescent pigments are preferred.

The fluorescent pigments comprise a polymer and a fluorescent dye. Suitable fluorescent pigments include, for example, those disclosed and claimed in U.S. Pat. No. 5,215,679 issued Mar. 15, 1994, and U.S. Pat. No. 5,294,664 which are specifically incorporated herein by reference. Preferably the fluorescent pigment is a dispersion, preferably an aqueous dispersion.

The preferred pigment is a fluorescent orange pigment which is comprises an acrylonitrile styrene polymer commercially available as "EPX 15 Blaze Orange™ pigment" from Day-Glo® Color Corp., Cleveland, Ohio. Other suitable fluorescent pigments include, for example "Fire Orange™" a red orange pigment, "Rocket Red™" a red pigment, "Aurora Pink®" a pink pigment, "Corona Magenta™" a red pigment, and "Arc Yellow™", a yellow pigment, Saturn Yellow™, a yellow pigment, Signal Green™, a green pigment, Horizon Blue™, a blue pigment, all of which are available from Day-Glo® Color Corp. These pigments fluoresce under ultra-violet light as well as in daylight.

The preferred pigments have the following composition: a water insoluble polymer comprising at least four monomers, at least one monomer selected from each of the following groups (i) through (iv); from about 40% to about 80%, preferably about 52% to about 65% total polymer weight of water insoluble vinyl monomer free of polar groups; from about 15% to about 35%, preferably about 25% to about 35%, total polymer weight of vinyl nitrile; from about 1.5% to about 4.5% total polymer weight of vinyl monomer containing sulfonate groups; from about 5% to about 20%, preferably about 5% to about 15%, total polymer weight of polar vinyl monomer selected from the group consisting of: polar acrylate esters, polar methacrylate esters, vinyl acetate, a substituted acrylamide containing hydroxyl or carboxylic ester groups, and mixtures thereof; and fluorescent dye. The fluorescent dye is present in an amount sufficient to impart fluorescent color to the pigment.

Most preferably the fluorescent pigment comprises: styrene as the water insoluble non polar vinyl monomer; sodium 2-acrylamido-2-methylpropane-sulfonate as the vinyl monomer containing sulfonate groups; hydroxypropyl methacrylate as the polar vinyl monomer; and acrylonitrile as the vinyl nitrile.

Preferably the fluorescent pigment is an aqueous dispersion so that water is present in an amount to provide a total solids content of from about 0.5% to less than 100%. Suitable fluorescent dyes include conventional dyes such as fluorescent type dyes belong to the dye families known as rhodamines, fluoresciens, coumarins, naphthalimides, benzoxanthenes, acridines, and azos. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 135, and Solvent Yellow 160. The fluorescent dyes comprise from about 0.1 to 15% of the total weight of the pigment. One or more fluorescent dyes are present in the fluorescent pigment. The fluorescent dyes, alone that is, without a polymer carrier, are less preferred indicators.

Sensors

Suitable sensors for sensing fluorescent markers include, for example, Micro-optic II Series 8230 from Dolan Jenner industries, Inc., Lawrence, Mass., and HUS 256-T33 EDGE/WIDTH/STATE Multiple Criteria Gauge from Honeywell Visitronic, Englewood, Col. The HUS 256-133 is a sensor with LED display device.

Optionally, the sensor is fitted with a filter which filter transmits wavelengths at which the fluorescent marker is most active. Blaze Orange™ fluorescent pigment emits light at about 580 to 590 nm. Thus, a filter which transmits at about 580 to 590 nm is preferred. The filter reduces the sensor's detection of light reflected from the background surrounding the marker and sharpens the contrast between the marker and the background. Such filter is particularly preferred when corn stalks and leaves are present since they tend to fluoresce under blacklight.

While the methods herein have been described as being used in the nighttime, such methods are also useful in the day, particularly where there is impaired visibility. The methods, particularly the method of traversing a field, are also of benefit to visually impaired farmers who may have difficulty seeing a field but who can see a readout device mounted within a few inches of their eyes.

Although certain embodiment of this invention have been shown and described, various adaptations and modifications can be made without departing from the scope of the invention as defined in the appended claims.

Having thus described the invention it is claimed as follows:

1. A method of traversing a field on equipment, comprising the following steps:
   a. providing a vehicle equipped with a marker dispenser which dispenses fluorescent markers, and an illumination source which emits light that will cause the markers to fluoresce;
   b. depositing the fluorescent markers along the field using the marker dispenser;
   c. directing the light from the light source on to the fluorescent markers to cause the fluorescent markers to fluoresce;
   d. detecting the fluorescence with a sensor;
   e. displaying the position of the vehicle relative the fluorescent markers;
   f. aligning the vehicle with the fluorescent markers;
   g. traversing the field using the fluorescent markers as a guide.

2. The method of claim 1, wherein the fluorescence is detected during the day.

3. The method of claim 1, wherein the fluorescent marker is colored with a fluorescent pigment.

4. The method of claim 3, wherein the fluorescent pigment is comprised of an acrylonitrile styrene polymer.

5. The method of claim 1, wherein the field is traversed at poor visibility.

6. A method of traversing a field at poor visibility on equipment, comprising the following steps:
   a. providing a vehicle equipped with a marker dispenser which dispenses fluorescent markers, and an illumination source which emits light that will cause the markers to fluoresce;
   b. depositing the fluorescent markers along the field using the marker dispenser;
   c. directing the light from the light source on to the fluorescent markers to cause the fluorescent markers to fluoresce and to permit the driver to perceive the fluorescent markers;
   d. detecting the fluorescence visually;
   e. aligning the vehicle with the fluorescent markers;
   g. traversing the field under conditions of poor visibility using the fluorescent markers as a guide.

7. A kit for determining the amount of an agricultural product applied to vegetation, comprising:
   a. fluorescent agricultural product for application to target vegetation, comprising: an agricultural product; and a fluorescent pigment which fluorescent pigment comprises a polymer carrier and a fluorescent dye;
   b. a container for containing the fluorescent agricultural product; and
   c. a fluorescent color chart containing at least one image of vegetation coated with the fluorescent agricultural product selected from the group consisting of: an image showing vegetation having the correct amount of fluorescent agricultural product, an image showing vegetation having less than the proper amount of fluorescent agricultural product, an image showing vegetation having more than the proper amount of fluorescent agricultural product, and combinations thereof; and
   d. an indication on said chart, to indicate whether the amount of fluorescent agricultural product depicted in said image is insufficient, in excess or correct.

8. The kit of claim 7 wherein the florescent agricultural product comprises a fluorescent pigment comprising an acrylonitrile styrene polymer.

9. The kit of claim 7, wherein the chart contains a first and second image of vegetation coated with the fluorescent product, wherein the first image depicts insufficient amount of product on the vegetation and the second image depicts excess product on the vegetation.

10. The kit of claim 9, wherein the chart further contains a third image of vegetation coated with fluorescent product and depicts the proper amount of agricultural product on vegetation.

11. A kit for determining the amount of an agricultural product applied to vegetation, comprising:
   a. fluorescent agricultural product for application to target vegetation, comprising: an agricultural product; and a fluorescent pigment which fluorescent pigment comprises a polymer carrier and a fluorescent dye;
   b. a container for containing the fluorescent agricultural product; and
   c. a color standard which depicts color of appropriately diluted fluorescent agricultural product.

12. A method of applying an agricultural product to vegetation or soil, comprising the following steps:
   a. providing a fluorescent agricultural product comprising a an agricultural product and a fluorescent indicator/pigment which fluorescent pigment comprises a polymer carrier and a fluorescent dye;
   b. providing an illumination source which emits light that will cause the fluorescent agricultural product to fluoresce;
   c. applying the fluorescent agricultural product onto the vegetation or soil;
   d. directing a light onto the vegetation or soil so as to cause the fluorescent agricultural product to fluoresce;
   e. detecting the fluorescence of the fluorescent product.

13. The method of claim 12, further comprising the steps of:
   f. repeating steps (d) and (e) so as to detect the perimeter of the product on the soil or vegetation.

14. The method of claim 12 wherein the florescent product comprises fluorescent pigment comprising an acrylonitrile styrene polymer.

15. The method of claim 12 wherein the agricultural product is applied by spraying.

16. A pathway detection system adapted for attachment to farm equipment for detecting marker balls in a field, comprising:
   a. an illumination source adapted for attachment to the farm equipment which emits light which will cause the marker balls to fluoresce and positioned to direct said light upon the marker balls;
   b. a sensor adapted for attachment to the farm equipment for detecting fluorescence of the marker balls wherein said sensor detects brightness variations in contrast between the marker balls and the background and converts the variations to electrical signals;
   c. a display device which is connected to the sensor and receives the electrical signals form the sensor, for displaying the position of the marker balls relative to the equipment; and
   d. a power source, electrically connected to the sensor, the display device and the illumination source.

17. The pathway detection system of claim 16, wherein the illumination source emits light of comprising 250–800 nm wavelengths.

18. The pathway detection system of claim 16, wherein sensor is further equipped with a filter.

19. The pathway detection system of claim 16, wherein the illumination source is further equipped with a filter which transmits greater than 0.47 percent of light having a wavelength of 365 nm and said filter transmits less than 0.012 percent of light having a wavelength of 405 nm or higher.

20. The pathway detection system of claim 16, wherein the illumination source is a halogen lamp.

21. A method for quantifying agricultural products applied to a target area comprising the following steps:
   (a) providing a fluorescent agricultural product comprising a an agricultural product and a fluorescent pigment which fluorescent pigment comprises a polymer carrier and a fluorescent dye;
   (b) positioning a collector to the target area;
   (c) applying the fluorescent agricultural product to the target area;
   (d) removing the collector;
   (e) quantifying the fluorescent product on the collector.

22. The method of claim 21, wherein the fluorescent product is quantified by fluorescent spectrometry.

23. The method of claim 21, wherein the fluorescent pigment is quantified by comparison to a standard.

24. A fluorescent agricultural product comprising: a fluorescent pigment comprising a polymer carrier and a fluorescent dye; and an agricultural product.

* * * * *